US011337110B2

(12) United States Patent
Meylan et al.

(10) Patent No.: US 11,337,110 B2
(45) Date of Patent: May 17, 2022

(54) OUT-OF-ORDER PACKET DELIVERY AND DECODING WITH HEADER COMPRESSION

(71) Applicant: QUALCOMM Incorporated, San Diego, CA (US)

(72) Inventors: Arnaud Meylan, San Diego, CA (US); Rajat Prakash, San Diego, CA (US); Leena Zacharias, San Jose, CA (US); Min Wang, San Diego, CA (US); Vinay Paradkar, Broomfield, CO (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/005,596

(22) Filed: Aug. 28, 2020

(65) Prior Publication Data

US 2022/0070727 A1     Mar. 3, 2022

(51) Int. Cl.
*H04W 28/06*  (2009.01)
*H04W 80/08*  (2009.01)
*H04L 69/22*  (2022.01)
*H04L 69/04*  (2022.01)

(52) U.S. Cl.
CPC ............ *H04W 28/06* (2013.01); *H04L 69/04* (2013.01); *H04L 69/22* (2013.01); *H04W 80/08* (2013.01)

(58) Field of Classification Search
None
See application file for complete search history.

(56) References Cited

U.S. PATENT DOCUMENTS

| 2008/0137687 | A1* | 6/2008 | Jiang | H04W 12/033 370/476 |
| 2009/0103445 | A1* | 4/2009 | Sammour | H04L 1/1887 370/252 |
| 2011/0263221 | A1* | 10/2011 | Yi | H04W 12/033 455/410 |
| 2020/0084664 | A1* | 3/2020 | Wu | H04L 47/34 |
| 2021/0044529 | A1* | 2/2021 | Salem | H04L 69/329 |

* cited by examiner

*Primary Examiner* — Diane L Lo
(74) *Attorney, Agent, or Firm* — Harrity & Harrity, LLP

(57) ABSTRACT

Various aspects of the present disclosure generally relate to wireless communication. In some aspects, a wireless receiver may receive, from a radio bearer configured to use header compression and at a lower layer of the wireless receiver, a plurality of packets based at least in part on the header compression, wherein the lower layer receives the plurality of packets in an out-of-order sequence. The wireless receiver may deliver, from the lower layer of the wireless receiver to a higher layer of the wireless receiver, the plurality of packets, after header decompression according to the out-of-order sequence, based at least in part on at least one threshold. Numerous other aspects are provided.

23 Claims, 8 Drawing Sheets

OUT-OF-ORDER PACKET DELIVERY AND DECODING WITH HEADER COMPRESSION

FIELD OF THE DISCLOSURE

Aspects of the present disclosure generally relate to wireless communication and to techniques and apparatuses for out-of-order packet delivery and decoding with header compression.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication includes: receiving, from a radio bearer configured to use header compression and at a lower layer of a wireless receiver, a plurality of packets based at least in part on the header compression, wherein the lower layer receives the plurality of packets in an out-of-order sequence; and delivering, from the lower layer of the wireless receiver to a higher layer of the wireless receiver, the plurality of packets, after header decompression according to the out-of-order sequence, based at least in part on at least one threshold.

In some aspects, a method of wireless communication includes: receiving, from a radio bearer configured to use header compression and at a lower layer of a wireless receiver, a configuration message associated with a compressed header included in a plurality of packets from the radio bearer, wherein the configuration message indicates at least one threshold for an out-of-order delivery of the plurality of packets; and receiving, from the radio bearer, the plurality of packets based at least in part on the at least one threshold.

In some aspects, a method of wireless communication includes: determining, by a radio bearer configured to use header compression, at least one threshold associated with an out-of-order delivery of a plurality of packets to a wireless receiver, wherein the at least one threshold is further associated with a compressed header included in the plurality of packets; and transmitting, to the wireless receiver, the plurality of packets based at least in part on the at least one threshold.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
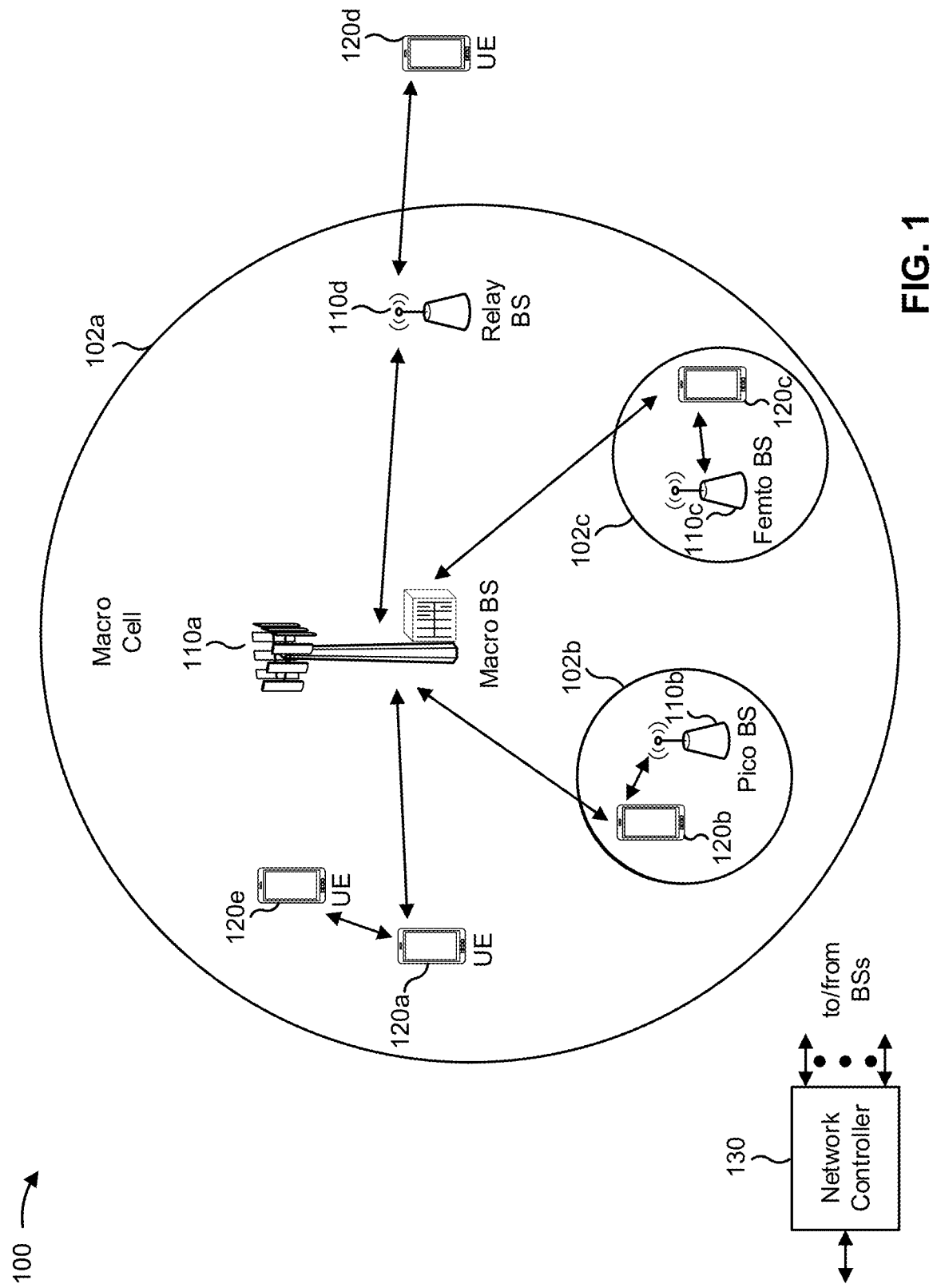
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
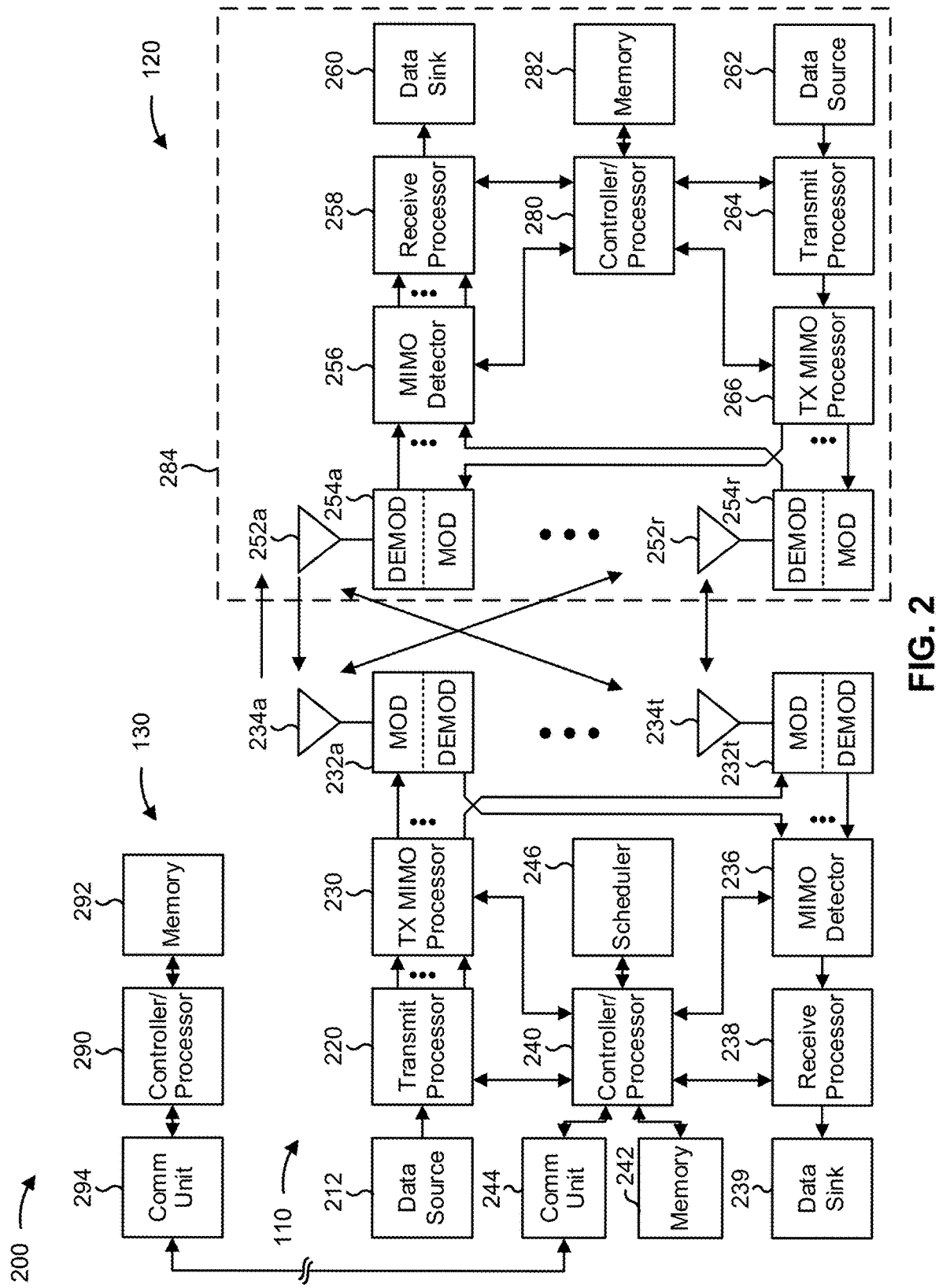
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-8.

Controller/processor 240 of base station 110, controller/processor 280 of UE 120, and/or any other component(s) of FIG. 2 may perform one or more techniques associated with out-of-order packet delivery and decoding with header compression, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, and/or other processes as described herein. In some aspects, executing instructions may include running the instructions, converting the instructions, compiling the instructions, interpreting the instructions, and/or the like.

In some aspects, a mobile station (e.g., UE 120) may include means for receiving, from a base station, a configuration message associated with a compressed header included in a plurality of packets from the base station, wherein the configuration message indicates at least one threshold for an out-of-order delivery of the plurality of packets; means for receiving, from the base station, the plurality of packets based at least in part on the at least one threshold; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a mobile station (e.g., UE 120) may include means for receiving, at a lower layer of the mobile station and from a base station, a plurality of packets, wherein the lower layer receives the plurality of packets in an out-of-order sequence based at least in part on packet loss; means for delivering, from the lower layer of the mobile station to a higher layer of the mobile station, the plurality of packets according to the out-of-order sequence, based at least in part on at least one threshold; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a base station (e.g., base station 110) may include means for determining at least one threshold associated with an out-of-order delivery of a plurality of packets to a mobile station, wherein the at least one threshold is further associated with a compressed header included in the plurality of packets; means for transmitting, to the mobile station, the plurality of packets based at least in part on the at least one threshold; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
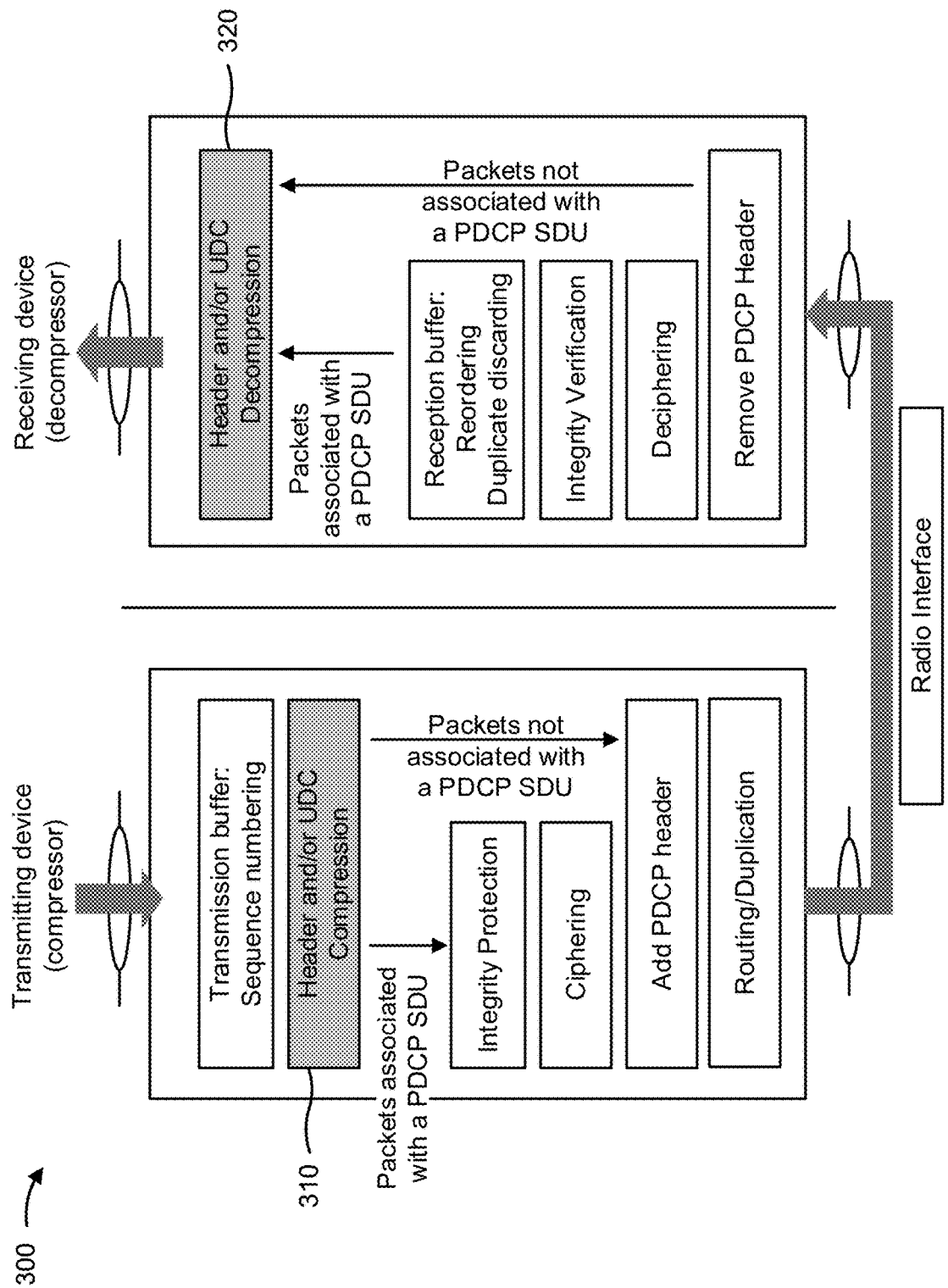
FIG. 3 is a diagram illustrating an example of a compression architecture, in accordance with various aspects of the present disclosure.

FIG. 3 is a diagram illustrating an example 300 of a compression architecture, in accordance with various aspects of the present disclosure. As shown in FIG. 3, the compression architecture includes a transmitting (or compressor) device and a receiving (or decompressor) device. In some cases, the compressor device may be a base station and the decompressor device may be a UE when compression is implemented on a downlink. In some cases, the compressor device may be a UE and the decompressor device may be a base station when compression is implemented on an uplink. In some cases, the compressor device may be a UE and the decompressor device may be another UE when compression is implemented on a sidelink. In some cases, the compressor device may be a base station and the decompressor device may be another base station when compression is implemented on a backhaul.

As shown in FIG. 3, and by reference number 310, the compressor device may perform compression for a packet to be transmitted to the decompressor device. For example, as shown, the compressor device may obtain a data block to be transmitted from transmission buffer and add a sequence number to the data block to form an Ethernet packet, an Internet protocol (IP) packet, transmission control protocol (TCP) packet, a user datagram protocol (UDP) packet, a real-time transport protocol (RTP) packet or another type of packet to be transmitted.

The compressor device may then perform compression to reduce the size of the packet. In some aspects, the compressor device may perform header compression to remove the header (e.g., an Ethernet header, an IP header, a TCP header, a UDP header, an RTP header, or another type of header) from the packet and attach a compression sub-header that includes a context identifier and/or other compressed header information. In some aspects, the compressor may perform uplink data compression (UDC) or another type of data compression to reduce the size of the packet. The compressor device may perform the compression based at least in part on a compression protocol or compression technique, such as robust header compression (RoHC), Ethernet header compression (EHC), UDC, and/or the like.

In some cases, if the packet is associated with a packet data convergence protocol (PDCP) service data unit (SDU), the packet may be subject to integrity protection and/or ciphering. After applying the integrity protection and/or ciphering, and/or if the packet is not associated with a PDCP SDU, the compressor device may add a PDCP header to form a packet data unit (PDU). The compressor device may then transmit the PDU with the compressed header to the decompressor device via a radio interface (e.g., a Uu interface, a PC5 interface, and/or the like).

As further shown in FIG. 3, the decompressor device may receive the PDU from the compressor device via the radio interface and remove the PDCP header from the PDU. In cases where the packet is associated with a PDCP SDU, the decompressor device may perform deciphering and integrity verification on the packet, and the packet may be stored in a reception buffer where incoming packets may be reordered (e.g., based on sequence number), duplicate packets may be discarded, and/or the like if the packet is successfully deciphered and passes integrity verification. As shown by reference number 320, the decompressor device may perform header decompression for the packets in the reception buffer and/or for packets that are not associated with a PDCP SDU. For example, the decompressor device may obtain a context identifier (e.g., an RoHC context identifier or another type of context identifier) from the packet and match the context identifier to information contained in a full header associated with a previous packet.

As indicated above, FIG. 3 is provided as an example. Other examples may differ from what is described with regard to FIG. 3.

Some compression techniques, such as RoHC, compress a sequence number or other indicator of packet order. The out-of-order delivery with which RoHC and other compression techniques can cope with depends at least in part on a size of the compressed sequence number. If the out-of-order delivery exceeds a maximum that the compression technique can handle, decompression errors may occur. To avoid these decompression errors, current 3GPP specifications for PDCP and radio resource configuration (RRC) do not allow for out-of-order delivery of packets when RoHC is configured.

Techniques and apparatuses described herein allow a network to configure out-of-order delivery when RoHC and/or other header compression is configured. In some aspects, a base station (e.g., base station 110) may use at least one threshold to determine when packets can be delivered out-of-order such that context for a sequence number and/or other indicator of packet order is not lost. Additionally, or alternatively, techniques and apparatuses described herein allow a mobile station (e.g., a UE 120 and/or the like) to perform out-of-order decoding when RoHC and/or other header compression is configured. In some aspects, the mobile station may use at least one threshold to determine when packets can be decoded out-of-order, at a higher layer, such that context for the sequence number and/or other indicator of packet order is not lost. By providing for out-of-order delivery and/or decoding, techniques and apparatuses described herein provide for lower latency on a network. In some aspects, packets may be delivered to an application as soon as the packets are received, and the application may decide when to continue decoding rather than waiting for missing packets. This can improve applications requiring very low latency, such as virtual reality applications and/or the like.

Figure 4:
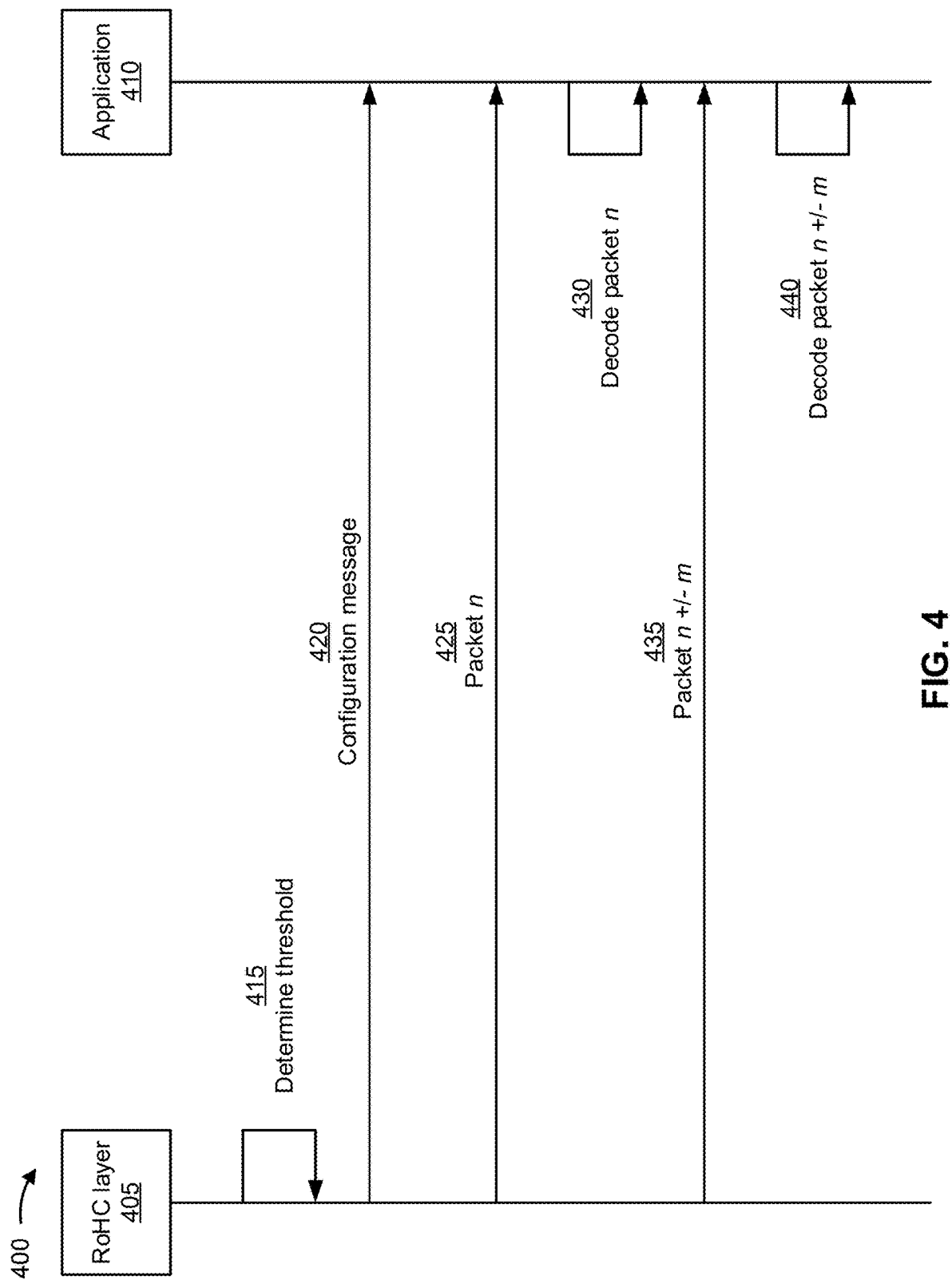
FIG. 4 is a diagram illustrating an example of out-of-order delivery of packets with header compression, in accordance with various aspects of the present disclosure.

FIG. 4 is a diagram illustrating an example 400 of out-of-order delivery of packets with header compression, in accordance with various aspects of the present disclosure. As shown in FIG. 4, a RoHC layer 405 may communicate with an application 410. For example, RoHC layer 405 and the application 410 may be implemented on a wireless receiver (e.g., a UE 120). Moreover, the RoHC layer 405 may communicate with a radio bearer (e.g., base station 110) using a physical layer (e.g., using wireless signals on wireless network 100 of FIG. 1 and/or the like). As used herein, a "radio bearer" may refer to a channel originating at a transmitter, such as a base station 110, a mobile station (e.g., another UE on a sidelink channel), and/or the like, and used to transfer control data or user data to a receiver (e.g., the UE 120, another base station on a wireless backhaul link, and/or the like). Although the description below will focus on the RoHC layer 405 in the UE 120, the description equally applies to other compression layers implemented on other mobile stations.

In some aspects, the RoHC layer 405 may configure the UE 120 to enable out of order deliver and compression for some radio bearers. Accordingly, as shown in connection with reference number 415, the RoHC layer 405 may determine at least one threshold associated with an out-of-order delivery of a plurality of packets to the UE 120. In some aspects, the plurality of packets includes at least one RTP packet.

In some aspects, the at least one threshold may be further associated with a compressed header included in the plurality of packets and/or with a PDCP sequence number associated with the packets. For example, the at least one threshold may include at least one integer related to a difference in sequence number between a current packet of the plurality of packets and a previous packet of the plurality of packets.

In some aspects, the at least one threshold may include a threshold associated with a negative difference between a current sequence number for a current packet of the plurality of packets and a previous sequence number for a previous packet of the plurality of packets. For example, the threshold associated with the negative difference may be based at least in part on an offset associated with the compressed header.

Additionally, or alternatively, the at least one threshold may include a threshold associated with a positive difference between a current sequence number for a current packet of the plurality of packets and a previous sequence number for a previous packet of the plurality of packets. For example, the threshold associated with the positive difference may be based at least in part on a number of bits included in at least a portion of the compressed header and an offset associated with the compressed header.

For example, the threshold associated with the negative difference and the threshold associated with the positive difference may be determined according to Table 1 below:

TABLE 1

| Bits in sequence number k | Offset (negative difference) p | Loss (positive difference) $(2^k - 1) - p$ |
|---|---|---|
| 4 | 1 | 14 |
| 5 | 0 | 31 |
| 6 | 1 | 62 |
| 7 | 3 | 124 |
| 8 | 7 | 248 |
| 9 | 15 | 496 |

In Table 1, k is the number of bits included in at least a portion of the compressed header (e.g., a sequence number of the compressed header); p is the offset associated with the compressed header as well as the negative difference between a current sequence number for a current packet of the plurality of packets; and $(2^k-1)-p$ is the positive difference between a current sequence number for a current packet of the plurality of packets and a previous sequence number for a previous packet of the plurality of packets. Table 1 is provided as an example only.

In some aspects, the value of parameter p may be modified to be larger when out-of-order delivery is configured. For example, as described below, the RoHC layer 405 may set the threshold associated with a positive difference close or equal to the threshold associated with a negative difference. Additionally, or alternatively, the radio bearer may modify the number of bits k over time based on communication quality and/or reliability.

In some aspects, the at least one threshold may be set lower than the examples shown in Table 1. For example, the RoHC layer 405 (and/or the application 410) may determine the threshold associated with a negative difference between a current sequence number for a current packet of the plurality of packets and a previous sequence number for a previous packet of the plurality of packets lower than p. Additionally, or alternatively, the RoHC layer 405 (and/or the application 410) may determine the threshold associated with a positive difference between a current sequence number for a current packet of the plurality of packets and a previous sequence number for a previous packet of the plurality of packets lower than $(2^k-1)-p$. In some aspects, the RoHC layer 405 (and/or the application 410) may determine the threshold associated with the positive difference closer to the threshold associated with the negative difference. Accordingly, the RoHC layer 405 may transmit, and the application 410 may decode, packets associated with higher sequence numbers without becoming unable to decode packets associated with lower sequence numbers because the threshold associated with the positive difference is much larger than the threshold associated with the negative difference (as shown, for example, in Table 1).

As shown in connection with reference number 420, the RoHC layer 405 may transmit, and the application 410 may receive, a configuration message indicating the at least one threshold. For example, the RoHC layer 405 may transmit, and the application 410 may receive, an RRC message. In some aspects, the configuration message may be associated with a radio bearer using compression and/or the compressed header included in the plurality of packets.

In some aspects, the compressed header is based at least in part on RoHC. Accordingly, the configuration message may include an indication of the RoHC. Additionally, or alternatively, the configuration message may include an indication of the out-of-order delivery of the plurality of packets.

In some aspects, the configuration message may include the at least one threshold. Additionally, or alternatively, the application 410 may determine the at least one threshold based at least in part on the configuration message. For example, the radio bearer may RRC configure the UE 120 for RoHC and out-of-order delivery, and this configuration may trigger the application 410 to determine the at least one threshold.

As shown in connection with reference numbers 425 and 435, the RoHC layer 405 may transmit, and the application 410 may receive, the plurality of packets based at least in part on the at least one threshold. In some aspects, transmitting the plurality of packets comprises arranging the plurality of packets, based at least in part on the at least one threshold, using a PDCP. For example, arranging the plurality of packets may be based at least in part on the plurality of packets satisfying the at least one threshold.

In some aspects, the RoHC layer 405 may determine, for each packet, SN_to_be_delivered−SN_last_delivered, where SN_to_be_delivered is a sequence number associated with a current packet, and SN_last_delivered is a sequence number associated with a previous packet. The RoHC layer 405 may transmit the current packet when SN_to_be_delivered−SN_last_delivered satisfies (e.g., is less than or equal in magnitude to) the at least one threshold. In some aspects, the RoHC layer 405 may verify SN_to_be_delivered−SN_last_delivered against a threshold associated with the positive difference or a threshold associated with the negative difference, as described above, based at least in part on whether SN_to_be_delivered−SN_last_delivered is positive or negative. The RoHC layer 405 may instead wait for a different packet when SN_to_be_delivered−SN_last_delivered does not satisfy (e.g., is larger in magnitude than) the at least one threshold.

For example, as shown in FIG. 4, the RoHC layer 405 may transmit packet n when n−0 satisfies the at least one threshold. Further, the RoHC layer 405 may transmit packet n+m when (n+m)−n satisfies the at least one threshold. As an alternative, the RoHC layer 405 may transmit packet n−m when (n−m)−n satisfies the at least one threshold. Whenever the at least one threshold is not satisfied, the RoHC layer 405 will wait until a new packet is ready to check the new packet against the threshold before transmitting.

In some aspects, the RoHC layer 405 may determine that at least one packet of the plurality of packets was not received by the UE 120, and rearrange remaining packets of the plurality of packets, using the PDCP, based at least in part on determining that the at least one packet was not received by the UE 120. In some aspects, determining that the at least one packet was not received by the UE 120 may be based at least in part on a non-acknowledgement (NACK) signal from the UE 120 (e.g., from a physical layer of the UE 120). Accordingly, the UE 120 may use hybrid automatic repeat request (HARD) signaling to determine packet losses in transmission.

In some aspects, rearranging the remaining packets of the plurality of packets may be further based at least in part on determining that at least one of the remaining packets does not satisfy the at least one threshold. For example, if the UE 120 did not receive packet n, the RoHC layer 405 may refrain from transmitting packet n+m (or n−m) if (n+m)−0 (or (n−m)−0) does not satisfy the at least one threshold.

As shown in connection with reference number 430 and 440, the application 410 may decode the plurality of packets according to the out-of-order delivery. For example, the RoHC layer 405 may deliver, from a lower layer of the UE 120 (e.g., the RoHC layer 405 and/or the like) to a higher layer of the UE 120 (e.g., the application 410 and/or the like), the plurality of packets according to the out-of-order delivery. Accordingly, in some aspects, the application 410 may decode the plurality of packets using a PDCP layer.

In some aspects, the application 410 may determine that at least one packet of the plurality of packets does not satisfy the at least one threshold and wait to decode the plurality of packets until at least one additional packet, of the plurality of packets, that satisfies the at least one threshold, is received. For example, if packet n+/−m did not satisfy the at least one threshold, the application 410 waits to receive another packet from the RoHC layer 405 before decoding (e.g., delivering to the PDCP layer and/or the like) packet n+/−m. The application 410 may apply the at least one threshold similarly to the RoHC layer 405, as described above in connection with reference numbers 425 and 435.

In some aspects, the radio bearer may transmit, and the UE 120 may receive, a configuration message disabling the out-of-order delivery when the radio bearer is performing handover for the UE 120. Additionally, or alternatively, the RoHC layer 405 may refrain from transmitting packets according to the out-of-order delivery until the handover is complete.

By using the technique described in connection with FIG. 4, the UE 120 may reduce latency. The UE 120 may also increase communication speed in connection with the reduced packet size provided by header compression (e.g., RoHC and/or the like).

As indicated above, FIG. 4 is provided as an example. Other examples may differ from what is described with respect to FIG. 4.

Figure 5:
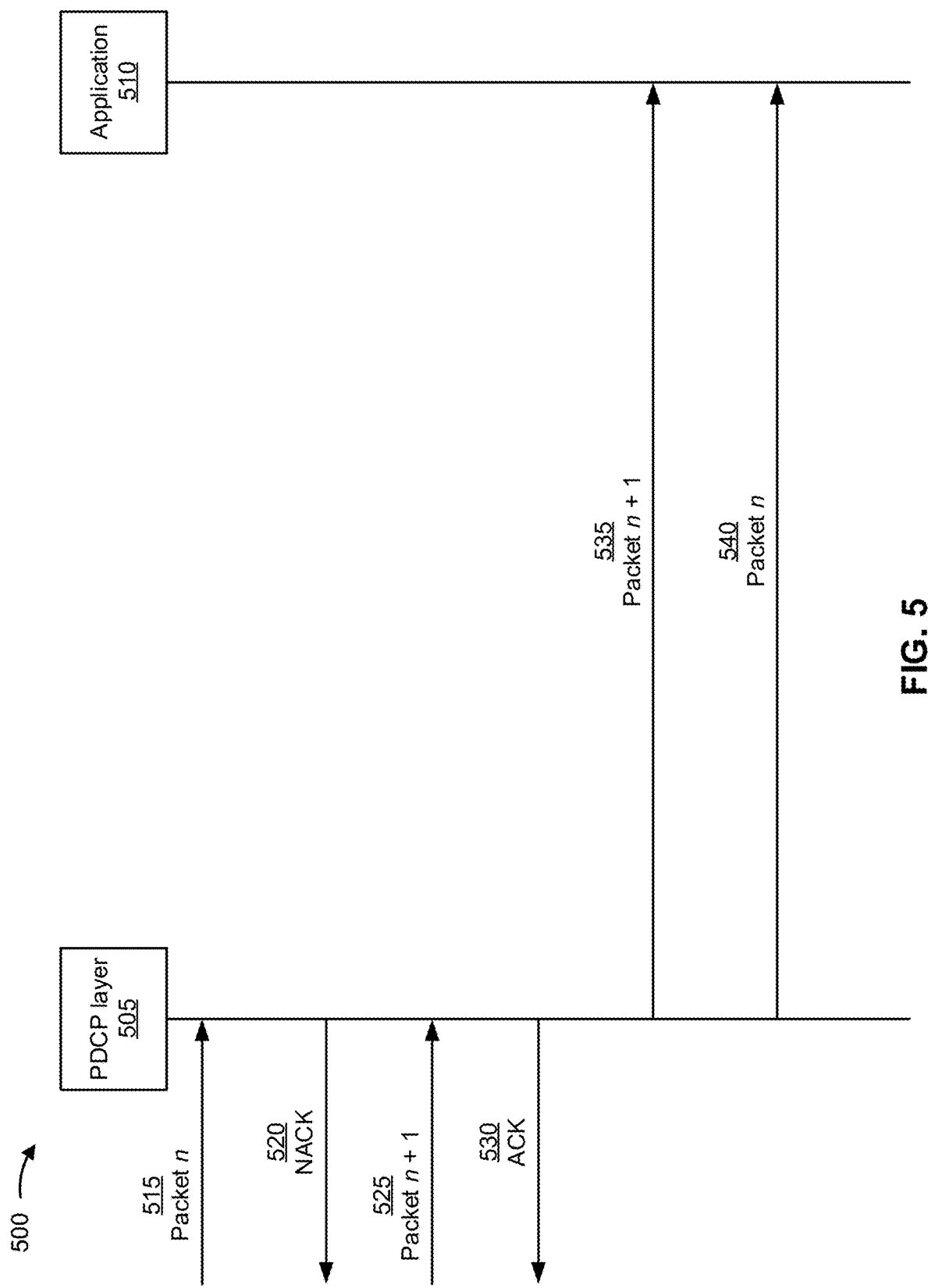
FIG. 5 is a diagram illustrating an example of out-of-order decoding of packets with header compression, in accordance with various aspects of the present disclosure.

FIG. 5 is a diagram illustrating an example 500 of out-of-order decoding of packets with header compression, in accordance with various aspects of the present disclosure. As shown in FIG. 5, a wireless receiver (e.g., a UE 120) may include a lower layer (e.g., a PDCP layer 505) and a higher layer (e.g., an application 510). The PDCP layer 505 may receive a plurality of packets from a radio bearer (e.g., from base station 110 using a physical layer of the UE 120 and/or the like) and pass the received packets to the application 510 for decoding. Although the description below will focus on the PDCP layer 505 in the UE 120, the description equally applies to other lower layers implemented on other mobile stations.

In some aspects, the plurality of packets includes at least one RTP packet. In some aspects, the radio bearer may encode a compressed header in the plurality of packets. For example, the compressed header may be based at least in part on RoHC. Accordingly, the radio bearer may RRC configure the UE 120 for RoHC and out-of-order delivery.

As shown in connection with reference number 515, the PDCP layer 505 may fail to receive a packet n from the radio bearer. For example, the physical layer of the UE 120 may fail to receive a signal from the radio bearer that carries packet n due to signal interference, low communication quality and/or reliability, and/or the like.

As shown in connection with reference number 520, the UE 120 may transmit a NACK signal to the radio bearer to indicate that packet n was not received. Accordingly, the UE 120 and the radio bearer may use HARQ signaling to determine packet losses in transmission.

As shown in connection with reference number 525, the PDCP layer 505 may receive a packet n+1 from the radio bearer. For example, the PDCP layer 505 may receive a signal from the radio bearer that carries packet n+1.

As shown in connection with reference number 530, the UE 120 may transmit an acknowledgment (ACK) signal to the radio bearer to indicate that packet n+1 was received. Accordingly, as described above, the UE 120 and the radio bearer may use HARQ signaling.

Therefore, as shown in connection with reference numbers 515, 520, 525, and 530, the UE 120 may receive, at the PDCP layer 505 and from the radio bearer, a plurality of packets in an out-of-order sequence based at least in part on packet loss. The radio bearer will thus re-transmit packet n after receiving the NACK signal from the UE 120.

As shown in connection with reference numbers 535 and 540, the UE 120 may deliver, from the PDCP layer 505 to the application 510, the plurality of packets according to the out-of-order sequence, based at least in part on at least one threshold. For example, the UE 120 may deliver, from the PDCP layer 505 to the application 510, packet n+1, as shown in connection with reference number 535, before delivering packet n, as shown in connection with reference number 540 (e.g., after packet n is retransmitted by the radio bearer). Accordingly, the application 510 may perform out-of-order decoding of the plurality of packets even though the radio bearer is not performing out-of-order delivery of the plurality of packets.

In some aspects, the at least one threshold may be associated with the compressed header included in the plurality of packets, as described above. For example, the at least one threshold may include at least one integer related to a difference in sequence number between a current packet of the plurality of packets and a previous packet of the plurality of packets.

As described above in connection with FIG. 4, the at least one threshold includes a first threshold associated with a negative difference between a current sequence number for a current packet of the plurality of packets and a previous sequence number for a previous packet of the plurality of packets, and a second threshold associated with a positive difference between the current sequence number for the current packet of the plurality of packets and the previous sequence number for the previous packet of the plurality of packets. For example, the UE 120 may determine the at least one threshold as described above in connection with reference number 405 of FIG. 4. In some aspects, the UE 120 may determine the at least one threshold based at least in part on Table 1, described above. Additionally, the UE 120 may verify that each packet satisfies the at least one threshold before delivering the packet from the PDCP layer 505 to the application 510. For example, the UE 120 may determine that the packet satisfies the at least one threshold as described above in connection with reference numbers 415 and 425 of FIG. 4.

Accordingly, the wireless receiver (e.g., the UE 120) may perform out-of-order decoding of packets even when the radio bearer has not configured out-of-order delivery for the packets. In some aspects, the UE 120 may refrain from decoding packets out-of-order delivery when the UE 120 is undergoing a handover procedure.

By using the technique described in connection with FIG. 5, the UE 120 may reduce latency. The UE 120 may also increase communication speed in connection with the reduced packet size provided by header compression (e.g., RoHC and/or the like).

As indicated above, FIG. 5 is provided as an example. Other examples may differ from what is described with respect to FIG. 5.

Figure 6:
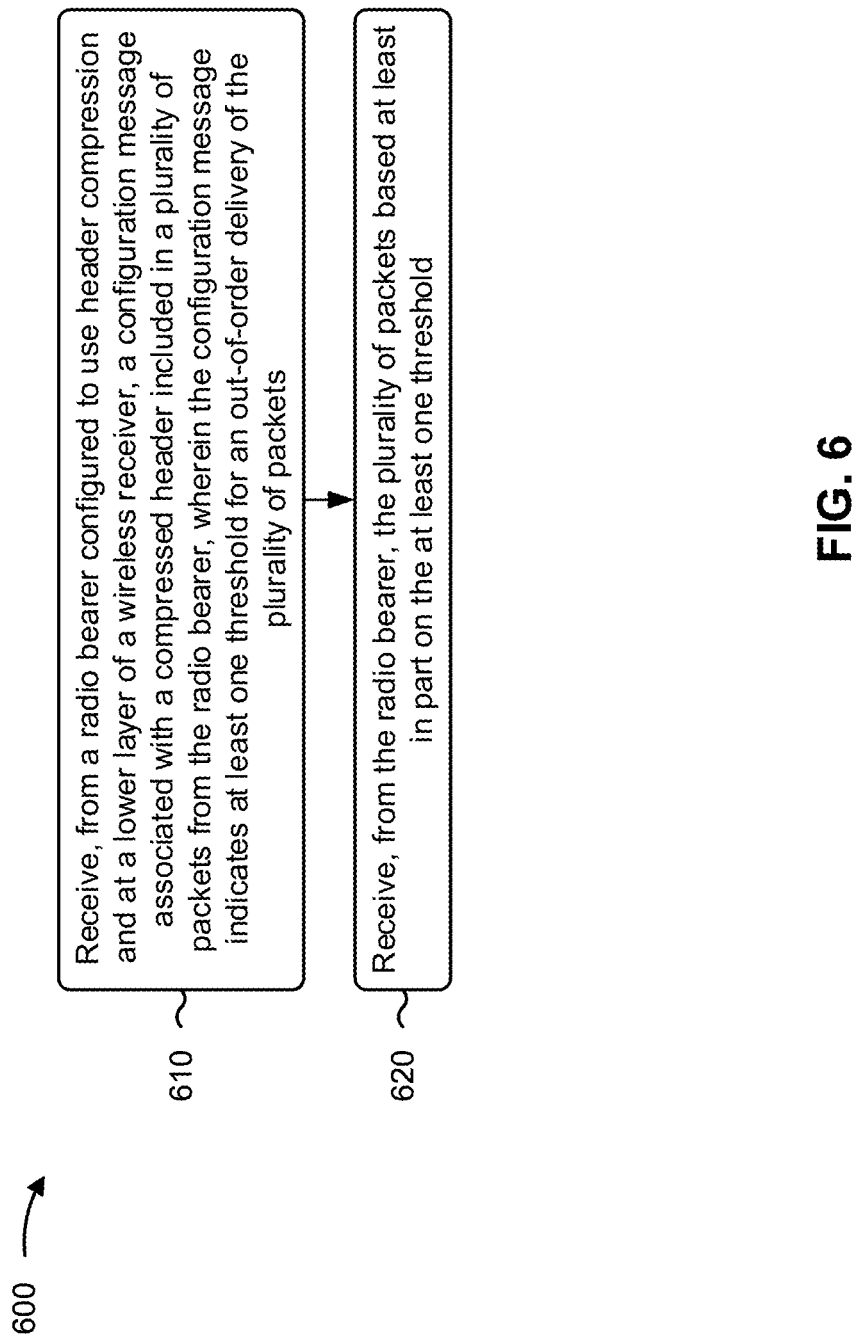
FIG. 6 is a diagram illustrating an example process performed by a wireless receiver (e.g., a mobile station, such as a UE), in accordance with various aspects of the present disclosure.

FIG. 6 is a diagram illustrating an example process 600 performed, for example, by a wireless receiver, in accordance with various aspects of the present disclosure. Example process 600 is an example where the wireless receiver (e.g., UE 120, another mobile station, and/or the like) performs operations associated with out-of-order packet delivery and decoding with header compression.

As shown in FIG. 6, in some aspects, process 600 may include receiving, from a radio bearer (e.g., base station 110 and/or the like) configured to use header compression and at a lower layer of the wireless receiver, a configuration message associated with a compressed header included in a plurality of packets from the radio bearer (block 610). For example, the wireless receiver (e.g., using receive processor 258, transmit processor 264, controller/processor 280, memory 282, and/or the like) may receive, from the radio bearer configured to use header compression and at the lower layer of the wireless receiver, the configuration message associated with the compressed header included in the plurality of packets from the radio bearer, as described above. In some aspects, the configuration message indicates at least one threshold for an out-of-order delivery of the plurality of packets.

As further shown in FIG. 6, in some aspects, process 600 may include receiving, from the radio bearer, the plurality of packets based at least in part on the at least one threshold (block 620). For example, the wireless receiver (e.g., using receive processor 258, transmit processor 264, controller/processor 280, memory 282, and/or the like) may receive, from the radio bearer, the plurality of packets based at least in part on the at least one threshold, as described above.

Process 600 may include additional aspects, such as any single aspect or any combination of aspects described below and/or in connection with one or more other processes described elsewhere herein.

In a first aspect, process 600 further includes receiving (e.g., using receive processor 258, transmit processor 264, controller/processor 280, memory 282, and/or the like), from the radio bearer, the configuration message that includes an indication of the header compression.

In a second aspect, alone or in combination with the first aspect, process 600 further includes receiving (e.g., using receive processor 258, transmit processor 264, controller/processor 280, memory 282, and/or the like), from the radio bearer, the configuration message that includes an indication of the out-of-order delivery of the plurality of packets.

In a third aspect, alone or in combination with one or more of the first and second aspects, the compressed header is based at least in part on RoHC.

In a fourth aspect, alone or in combination with one or more of the first through third aspects, the at least one threshold includes a first threshold associated with a negative difference between a current sequence number for a current packet of the plurality of packets and a previous sequence number for a previous packet of the plurality of packets, and a second threshold associated with a positive difference between the current sequence number for the current packet of the plurality of packets and the previous sequence number for the previous packet of the plurality of packets.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
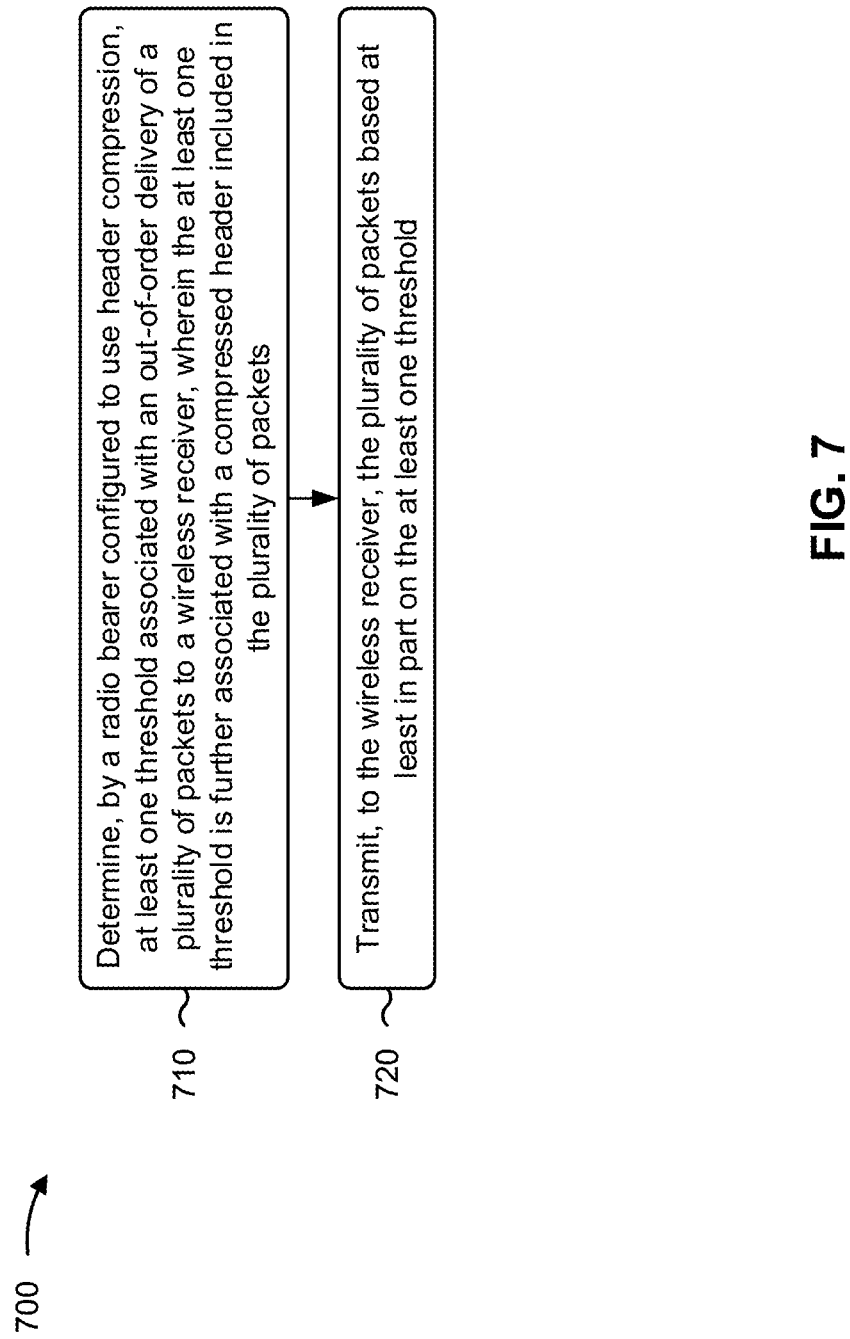
FIG. 7 is a diagram illustrating an example process performed by a wireless transmitter (e.g., a base station), in accordance with various aspects of the present disclosure.

FIG. 7 is a diagram illustrating an example process 700 performed, for example, by a radio bearer, in accordance with various aspects of the present disclosure. Example process 700 is an example where the radio bearer (e.g., base station 110 and/or the like) performs operations associated with out-of-order packet delivery with header compression.

As shown in FIG. 7, in some aspects, process 700 may include determining, by the radio bearer configured to use header compression, at least one threshold associated with an out-of-order delivery of a plurality of packets to a wireless receiver (e.g., UE 120, another mobile station, and/or the like) (block 710). For example, the radio bearer (e.g., using transmit processor 220, receive processor 238, controller/processor 240, memory 242, and/or the like) may determine the at least one threshold associated with the out-of-order delivery of the plurality of packets to the wireless receiver, as described above. In some aspects, the at least one threshold is further associated with a compressed header included in the plurality of packets.

As further shown in FIG. 7, in some aspects, process 700 may include transmitting, to the wireless receiver, the plurality of packets based at least in part on the at least one threshold (block 720). For example, the radio bearer (e.g., using transmit processor 220, receive processor 238, controller/processor 240, memory 242, and/or the like) may transmit, to the wireless receiver, the plurality of packets based at least in part on the at least one threshold, as described above.

Process 700 may include additional aspects, such as any single aspect or any combination of aspects described below and/or in connection with one or more other processes described elsewhere herein.

In a first aspect, process 700 further includes transmitting (e.g., using transmit processor 220, receive processor 238, controller/processor 240, memory 242, and/or the like), to the wireless receiver, a configuration message that includes an indication of the header compression.

In a second aspect, alone or in combination with the first aspect, process 700 further includes transmitting (e.g., using transmit processor 220, receive processor 238, controller/processor 240, memory 242, and/or the like), to the wireless receiver, a configuration message that includes an indication of the out-of-order delivery of the plurality of packets.

In a third aspect, alone or in combination with one or more of the first and second aspects, the compressed header is based at least in part on RoHC.

In a fourth aspect, alone or in combination with one or more of the first through third aspects, the at least one threshold includes a first threshold associated with a negative difference between a current sequence number for a current packet of the plurality of packets and a previous sequence number for a previous packet of the plurality of packets, and a second threshold associated with a positive difference between the current sequence number for the current packet of the plurality of packets and the previous sequence number for the previous packet of the plurality of packets.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
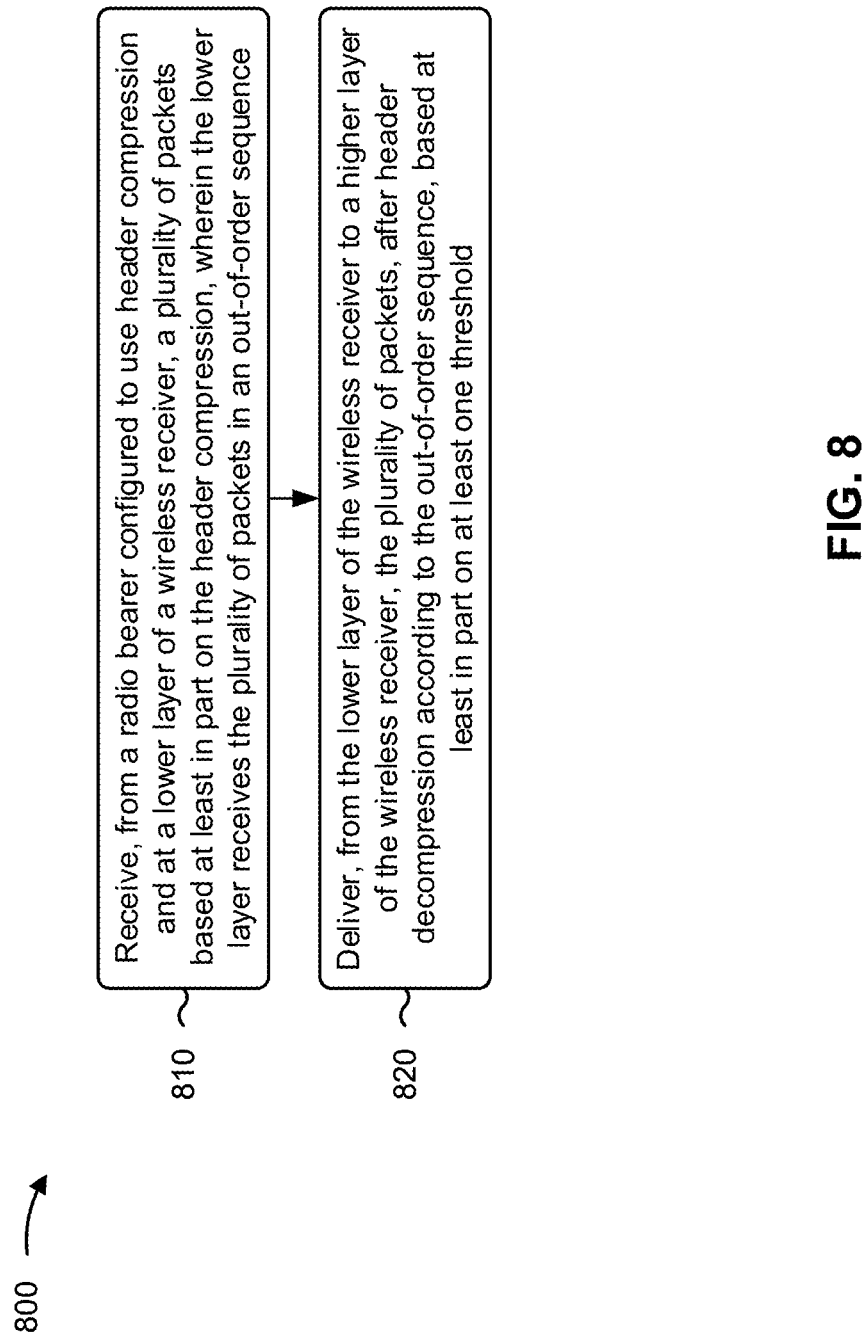
FIG. 8 is a diagram illustrating another example process performed by a wireless receiver (e.g., a mobile station, such as a UE), in accordance with various aspects of the present disclosure.

FIG. 8 is a diagram illustrating an example process 800 performed, for example, by a wireless receiver, in accordance with various aspects of the present disclosure. Example process 800 is an example where the wireless receiver (e.g., UE 120, another mobile station, and/or the like) performs operations associated with out-of-order packet decoding with header compression.

As shown in FIG. 8, in some aspects, process 800 may include receiving, from a radio bearer (e.g., base station 110 and/or the like) configured to use header compression and at a lower layer of a wireless receiver, a plurality of packets based at least in part on the header compression (block 810). For example, the wireless receiver (e.g., using receive processor 258, transmit processor 264, controller/processor 280, memory 282, and/or the like) may receive, from the radio bearer configured to use header compression and at the lower layer of a wireless receiver, the plurality of packets, as described above. In some aspects, the lower layer receives the plurality of packets in an out-of-order sequence.

As further shown in FIG. 8, in some aspects, process 800 may include delivering, from the lower layer of the wireless receiver to a higher layer of the wireless receiver, the plurality of packets, after header decompression according to the out-of-order sequence, based at least in part on at least one threshold (block 820). For example, the wireless receiver (e.g., using receive processor 258, transmit processor 264, controller/processor 280, memory 282, and/or the like) may deliver, from the lower layer of the wireless receiver to the higher layer of the wireless receiver, the plurality of packets, after header decompression according to the out-of-order sequence, based at least in part on the at least one threshold, as described above.

Process 800 may include additional aspects, such as any single aspect or any combination of aspects described below and/or in connection with one or more other processes described elsewhere herein.

In a first aspect, the wireless receiver delivers (e.g., using receive processor 258, transmit processor 264, controller/processor 280, memory 282, and/or the like) the plurality of packets from the lower layer of the wireless receiver to the higher layer of the wireless receiver according to the out-of-order delivery.

In a second aspect, alone or in combination with the first aspect, the delivering is based at least in part on the plurality of packets satisfying the at least one threshold.

In a third aspect, alone or in combination with one or more of the first and second aspects, process 800 further includes determining (e.g., using receive processor 258, transmit processor 264, controller/processor 280, memory 282, and/or the like) that at least one packet of the plurality of packets was not received by the wireless receiver; and rearranging (e.g., using receive processor 258, transmit processor 264, controller/processor 280, memory 282, and/or the like) remaining packets of the plurality of packets, using a packet data convergence protocol, based at least in part on determining that the at least one packet was not received.

In a fourth aspect, alone or in combination with one or more of the first through third aspects, the header compression is based at least in part on RoHC.

In a fifth aspect, alone or in combination with one or more of the first through fourth aspects, process 800 further includes determining (e.g., using receive processor 258, transmit processor 264, controller/processor 280, memory 282, and/or the like) the at least one threshold based at least in part on the header compression.

In a sixth aspect, alone or in combination with one or more of the first through fifth aspects, the plurality of packets includes at least one RTP packet.

In a seventh aspect, alone or in combination with one or more of the first through sixth aspects, process 800 further includes decoding (e.g., using receive processor 258, transmit processor 264, controller/processor 280, memory 282, and/or the like) the plurality of packets using a PDCP.

In an eighth aspect, alone or in combination with one or more of the first and seventh aspects, process 800 further includes determining (e.g., using receive processor 258, transmit processor 264, controller/processor 280, memory 282, and/or the like) that at least one packet of the plurality of packets does not satisfy the at least one threshold; and waiting to decode (e.g., using receive processor 258, transmit processor 264, controller/processor 280, memory 282, and/or the like) the plurality of packets until at least one additional packet, of the plurality of packets, that satisfies the at least one threshold, is received.

In a ninth aspect, alone or in combination with one or more of the first through eighth aspects, the at least one threshold includes a threshold associated with a negative difference between a current sequence number for a current packet of the plurality of packets and a previous sequence number for a previous packet of the plurality of packets.

In a tenth aspect, alone or in combination with one or more of the first through ninth aspects, the threshold associated with the negative difference is based at least in part on an offset associated with the compressed header.

In an eleventh aspect, alone or in combination with one or more of the first through tenth aspects, the at least one threshold includes a threshold associated with a positive difference between a current sequence number for a current packet of the plurality of packets and a previous sequence number for a previous packet of the plurality of packets.

In a twelfth aspect, alone or in combination with one or more of the first through eleventh aspects, the threshold associated with the positive difference is based at least in part on a number of bits included in at least a portion of the compressed header and an offset associated with the compressed header.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication, comprising:
   receiving, from a radio bearer configured to use header compression and at a lower layer of a wireless receiver, a plurality of packets based at least in part on the header compression, wherein the lower layer receives the plurality of packets in an out-of-order sequence; and
   delivering, based at least in part on at least one threshold and after header decompression according to the out-of-order sequence, the plurality of packets from the lower layer of the wireless receiver to a higher layer of the wireless receiver.

2. The method of claim 1, wherein the wireless receiver delivers the plurality of packets from the lower layer of the wireless receiver to the higher layer of the wireless receiver according to the out-of-order sequence.

3. The method of claim 1, wherein the delivering is based at least in part on the plurality of packets satisfying the at least one threshold.

4. The method of claim 3, further comprising:
   determining that at least one packet of the plurality of packets was not received by the wireless receiver; and
   rearranging remaining packets of the plurality of packets, using a packet data convergence protocol, based at least in part on determining that the at least one packet was not received.

5. The method of claim 1, wherein the header compression is based at least in part on robust header compression (RoHC).

6. The method of claim 1, further comprising:
   determining the at least one threshold based at least in part on the header compression.

7. The method of claim 1, wherein the plurality of packets includes at least one real-time transport protocol packet.

8. The method of claim 1, further comprising:
   decoding the plurality of packets using a packet data convergence protocol.

9. The method of claim 8, further comprising:
   determining that at least one packet of the plurality of packets does not satisfy the at least one threshold; and
   waiting to decode the plurality of packets until at least one additional packet, of the plurality of packets, that satisfies the at least one threshold, is received.

10. The method of claim 1, wherein the at least one threshold includes a threshold associated with a negative difference between a current sequence number for a current packet of the plurality of packets and a previous sequence number for a previous packet of the plurality of packets.

11. The method of claim 10, wherein the threshold associated with the negative difference is based at least in part on an offset associated with the header compression.

12. The method of claim 1, wherein the at least one threshold includes a threshold associated with a positive difference between a current sequence number for a current packet of the plurality of packets and a previous sequence number for a previous packet of the plurality of packets.

13. The method of claim 12, wherein the threshold associated with the positive difference is based at least in part on a number of bits included in the current sequence number and an offset associated with the header compression.

14. A method of wireless communication, comprising:
    receiving, from a radio bearer configured to use header compression and at a lower layer of a wireless receiver, a configuration message associated with a compressed header included in a plurality of packets from the radio bearer, wherein the configuration message indicates at least one threshold for an out-of-order delivery of the plurality of packets, wherein the at least one threshold is associated with the header compression; and receiving, from the radio bearer, the plurality of packets based at least in part on the at least one threshold.

15. The method of claim 14, further comprising:

receiving, from the radio bearer, the configuration message that includes an indication of the header compression.

16. The method of claim 14, further comprising:

receiving, from the radio bearer, the configuration message that includes an indication of the out-of-order delivery of the plurality of packets.

17. The method of claim 14, wherein the header compression is based at least in part on robust header compression (RoHC).

18. The method of claim 14, wherein the at least one threshold includes a first threshold associated with a negative difference between a current sequence number for a current packet of the plurality of packets and a previous sequence number for a previous packet of the plurality of packets, and a second threshold associated with a positive difference between the current sequence number for the current packet of the plurality of packets and the previous sequence number for the previous packet of the plurality of packets.

19. A method of wireless communication, comprising:

determining, by a radio bearer configured to use header compression, at least one threshold associated with an out-of-order delivery of a plurality of packets to a wireless receiver, wherein the at least one threshold is based on header compression of a compressed header included in the plurality of packets; and transmitting, to the wireless receiver, the plurality of packets based at least in part on the at least one threshold.

20. The method of claim 19, further comprising:

transmitting, to the wireless receiver, a configuration message that includes an indication of the header compression.

21. The method of claim 19, further comprising:

transmitting, to the wireless receiver, a configuration message that includes an indication of the out-of-order delivery of the plurality of packets.

22. The method of claim 19, wherein the header compression is based at least in part on robust header compression (RoHC).

23. The method of claim 19, wherein the at least one threshold includes a first threshold associated with a negative difference between a current sequence number for a current packet of the plurality of packets and a previous sequence number for a previous packet of the plurality of packets, and a second threshold associated with a positive difference between the current sequence number for the current packet of the plurality of packets and the previous sequence number for the previous packet of the plurality of packets.

\* \* \* \* \*